(12) United States Patent
Groβe et al.

(10) Patent No.: US 8,574,008 B2
(45) Date of Patent: Nov. 5, 2013

(54) BATTERY CELL CONNECTOR

(75) Inventors: Jürgen Groβe, Mönchengladbach (DE); Franz-Josef Lietz, Oberhausen-Lirich (DE); Adelheid Klinkner, Neuss (DE)

(73) Assignees: Bayerische Motoren Werke, Munchen (DE); Auto Kabel Managementgesellschaft mbH, Hausen i.W. (DE)

( * ) Notice: Subject to any disclaimer, the term of this patent is extended or adjusted under 35 U.S.C. 154(b) by 0 days.

(21) Appl. No.: 13/376,746

(22) PCT Filed: Jun. 8, 2010

(86) PCT No.: PCT/EP2010/058007
§ 371 (c)(1),
(2), (4) Date: Dec. 7, 2011

(87) PCT Pub. No.: WO2010/142679
PCT Pub. Date: Dec. 16, 2010

(65) Prior Publication Data
US 2012/0100761 A1    Apr. 26, 2012

(30) Foreign Application Priority Data

Jun. 8, 2009 (DE) .................. 10 2009 024 513
Sep. 21, 2009 (DE) .................. 20 2009 012 647 U
Apr. 20, 2010 (DE) .................. 10 2010 015 810

(51) Int. Cl.
*H01R 24/00* (2011.01)
(52) U.S. Cl.
USPC ....................................................... 439/627
(58) Field of Classification Search
USPC ............. 439/627, 32, 33; 429/158, 160, 121, 429/123
See application file for complete search history.

(56) References Cited

U.S. PATENT DOCUMENTS 482,012 A * 9/1892 Knowles .................. 439/504
1,073,670 A * 9/1913 Ford ........................ 439/504

(Continued)

FOREIGN PATENT DOCUMENTS

DE    3033117    4/1982    ............ H01M 10/39
DE    69600849   3/1999    ............ H01M 2/10

(Continued)

OTHER PUBLICATIONS

International Searching Authority, International Search Report—International Application No. PCT/EP2010/058007, dated Nov. 19, 2010, together with the Written Opinion of the International Searching Authority, 31 pages.

*Primary Examiner* — Neil Abrams
(74) *Attorney, Agent, or Firm* — Sunstein Kann Murphy & Timbers LLP (57) ABSTRACT

A battery cell connector includes a first terminal part formed for connection to a battery terminal of a first battery, a second terminal part, and a connecting part arranged between the terminal parts and electrically connecting the terminal parts to one another. The connecting part has a Z-shaped longitudinal cross-section. The Z-shaped longitudinal cross-section includes a central web which is inclined by no more than 20° such that the connecting part is elastically deformable in at least two perpendicular spatial directions. The first terminal part is formed from a first electrically conductive material and a flat piece formed from a second and different type electrically conductive material may be bonded to the second terminal part. It is often desirable for the conductive material to correspond to the battery terminal to which it is to be joined.

21 Claims, 5 Drawing Sheets

(56) References Cited

U.S. PATENT DOCUMENTS

| | | | |
|---|---|---|---|
| 1,373,241 A * | 3/1921 | Heberling et al. | 429/121 |
| 1,560,308 A * | 11/1925 | Perry | 200/278 |
| 3,212,046 A * | 10/1965 | Abel et al. | 439/502 |
| 3,422,213 A * | 1/1969 | Boodley et al. | 174/72 R |
| 3,706,955 A * | 12/1972 | Bunnell | 439/512 |
| 4,118,097 A | 10/1978 | Budnick | 339/232 |
| 4,156,552 A * | 5/1979 | Wilson et al. | 439/504 |
| 4,698,952 A | 10/1987 | Oberdorf | 53/456 |
| 4,973,370 A * | 11/1990 | Kreinberg | 156/50 |
| 5,071,368 A * | 12/1991 | Garritano et al. | 439/504 |
| 5,154,646 A * | 10/1992 | Shoup | 439/772 |
| 5,378,552 A * | 1/1995 | Dixon, Jr. | 429/91 |
| 5,541,380 A * | 7/1996 | Ogden et al. | 219/56 |
| 5,578,392 A | 11/1996 | Kawamura | 429/99 |
| 5,605,474 A * | 2/1997 | Auclair | 439/505 |
| 5,804,770 A * | 9/1998 | Tanaka | 174/138 F |
| 6,240,637 B1 | 6/2001 | Ikeda et al. | 29/854 |
| 6,293,803 B1 * | 9/2001 | Rust et al. | 439/33 |
| 6,315,575 B1 * | 11/2001 | Kajimoto | 439/33 |
| 6,773,301 B1 * | 8/2004 | Chaskin | 439/500 |
| 6,929,504 B2 | 8/2005 | Ling et al. | 439/485 |
| 7,121,835 B2 * | 10/2006 | Silva | 439/33 |
| 7,270,576 B2 * | 9/2007 | Kim et al. | 439/627 |
| 7,294,020 B2 * | 11/2007 | Zhao et al. | 439/627 |
| 7,479,346 B1 * | 1/2009 | Chow et al. | 429/158 |
| 7,507,124 B2 * | 3/2009 | Kim | 439/627 |
| 7,601,457 B2 * | 10/2009 | Byun et al. | 429/121 |
| 7,736,796 B2 * | 6/2010 | Nagatani et al. | 429/158 |
| 7,776,467 B2 * | 8/2010 | Kato et al. | 429/160 |
| 8,114,540 B2 * | 2/2012 | Trester et al. | 429/160 |
| 8,133,607 B1 * | 3/2012 | Chen et al. | 429/158 |
| 8,148,627 B2 * | 4/2012 | Rose et al. | 136/244 |
| 8,440,907 B2 * | 5/2013 | Kurahashi et al. | 136/256 |
| 2004/0166727 A1 | 8/2004 | Ling et al. | 439/507 |
| 2005/0100785 A1 | 5/2005 | Enomoto et al. | 429/174 |
| 2006/0032667 A1 | 2/2006 | Sato | 174/260 |
| 2007/0026306 A1* | 2/2007 | Lee et al. | 429/160 |
| 2007/0099073 A1* | 5/2007 | White et al. | 429/158 |
| 2008/0102362 A1 | 5/2008 | Nii et al. | 429/161 |
| 2009/0104514 A1 * | 4/2009 | Lietz et al. | 429/121 |
| 2009/0274956 A1* | 11/2009 | Kosugi et al. | 429/158 |
| 2011/0081568 A1* | 4/2011 | Kim et al. | 429/158 |
| 2011/0117420 A1* | 5/2011 | Kim et al. | 429/158 |
| 2012/0100761 A1* | 4/2012 | Gro e et al. | 439/774 |

FOREIGN PATENT DOCUMENTS

| | | | |
|---|---|---|---|
| DE | 102006050705 | 4/2008 | H01B 7/08 |
| EP | 0133511 | 2/1985 | B65B 41/06 |
| EP | 1077497 | 2/2001 | H01M 2/20 |
| EP | 1300896 | 4/2003 | H01M 2/20 |
| EP | 1313156 | 5/2003 | H01M 2/20 |
| GB | 2083278 | 3/1982 | H01M 2/20 |
| JP | 2002-151045 | 5/2002 | H01M 2/20 |
| WO | WO 89/04065 | 5/1989 | |
| WO | WO 2008/098193 | 8/2008 | H01B 5/02 |
| WO | WO 2009/041735 | 4/2009 | H01M 2/20 |
| WO | WO 2010/012322 | 2/2010 | H01R 13/03 |

\* cited by examiner

BATTERY CELL CONNECTOR

The subject-matter relates to a battery cell connector comprising a first terminal part formed for connecting to a battery terminal of a first battery, a second terminal part, and a connecting part which is arranged between the terminal parts and electrically connects the terminal parts to one another. The subject-matter furthermore relates to a method for producing such a battery cell connector and to a system comprising a battery cell connector and a plurality of batteries.

Batteries, in particular lithium ion batteries, but also metal hydride batteries such as nickel metal hydride batteries, or lithium polymer batteries or other chemical energy storage devices, are becoming of ever greater importance in the motor-vehicle industry. In particular owing to the demand for alternative power concepts, for example hybrid power or pure electrical power, the storage of electrical energy is of immense significance for future motor vehicle manufacture.

The use of new types of batteries, for example lithium ion batteries, as electrical energy storage devices for electric motors in motor vehicle manufacture has proven advantageous. On the one hand, these accumulators store a large amount of energy in a small volume, and on the other hand such batteries are only limitedly subject to an ageing process. In particular, no "memory effect" occurs in them. A large number of charging cycles can therefore take place, so that the lifetime of the batteries substantially corresponds to that of a vehicle.

Most batteries, however, only provide low voltages of between one volt and several tens of volts. These low voltages are far from sufficient to power an electric motor of an electrical vehicle. Furthermore, most batteries only provide an electric charge of between 1000 and 5000 mAh, which is not sufficient to power a vehicle for long enough. For this reason, batteries are connected together to form so-called battery packs. In this case, a plurality of individual batteries (cells) can be connected to one another in series, so that the output voltage of the battery pack is multiplied according to the number of batteries connected in series. Battery packs with a total of 96 batteries are preferably used. In this case, for example, eight modules of twelve batteries each are connected together. In each module, for example, six batteries arranged vertically above one another in a column are connected together in series. Such a column is connected in series with a second column, arranged horizontally next to it, of the same module. With an output voltage of 4 V per battery, for example, this gives a total output voltage of 4 V times 12 batteries amounting to 48 V per module and 384 V per battery pack.

A problem with the construction of a module, however, is the contact of two batteries, respectively to be connected in series, with their respective oppositely poled terminals. On the one hand, because of the chemical energy storage in the batteries, the battery terminal of a first polarity is made of a different metal from the battery terminal of a second polarity in the same battery. In the case of lithium ion batteries, for example, one battery terminal is made of steel and a second battery terminal of aluminium. Other combinations of metals are, however, also conventional. With most types of batteries, it is found that the terminals of different polarity are made from different metals.

Furthermore, the distance between two oppositely placed terminals is subject to tolerance because of production-related variations in the production of batteries. This means that when two batteries are arranged next to one another substantially in a plane, the terminals may not be exactly coplanar. Furthermore, the positive terminal of a battery is often formed by a projection on one battery cover and the negative terminal by a recess on the oppositely placed cover of the battery. If a positive terminal of a first battery is then intended to be connected to a negative terminal of a second battery, it is necessary to cater on the one hand for the different metals and on the other hand for the tolerance-related variation of the terminals with respect to one another.

Furthermore, the strength of the current flow through the contact is very high since a plurality of batteries are connected in series which when loaded provide a plurality of amperes, possibly even several tens of amperes or several hundreds of amperes. These high currents have to flow through all the batteries and the respective battery cell connectors. The electrical contacts of the battery terminals to the battery cell connectors must therefore have low resistance, in order to minimise the heat loss in the connectors. For this reason, it is necessary to ensure a clean electrical contact throughout the lifetime of the battery module. In order to achieve this, the battery cell connectors are regularly connected to the battery terminals with a material fit.

In known battery modules, there is then the problem of establishing a low junction resistance between a battery terminal and the battery cell connector while taking into account the different metals of the battery terminals. The problem of compensating for tolerances of the battery lengths furthermore arises. There is also the problem of connecting a plurality of batteries to one another electrically and with a material fit in a working step which is simple to carry out.

In known battery modules, the problem also arises that high shear, compressive and/or tensile forces act on the cell connector, in particular in a vehicle during operation, which can lead to the connections between the cell connectors and the battery terminals being broken. These forces also occur during installation. It was therefore a further object of the invention to provide a cell connector which can absorb the forces arising and reduce transmission of the forces to the points of connection to the battery terminals.

This object is achieved by a battery cell connector according to one of the independent claims.

According to another aspect, the first terminal part is formed at least on the side facing a battery terminal from a first electrically conductive material and in that a flat piece, which is formed for connection to a second battery terminal and is formed at least on the side facing the second battery terminal from a second electrically conductive material different from the first electrically conductive material, is arranged with a materially bonded (material fit) on the second terminal part.

It has been discovered that connections between battery cell connectors and battery terminals with a low junction resistance are possible when the different materials of the oppositely poled battery terminals are taken into account. To this end, a materially uniform junction between the cell connector and the battery terminal may be selected. A first terminal part, which is connected to a first battery terminal, may be formed from a first electrically conductive material. The battery cell connector connects the first terminal part to the second terminal part via the connecting part. A terminal of a second battery, of opposite pole to the first battery terminal, should be electrically connected to the second terminal part. Since this oppositely poled battery terminal is made of a different material than the first battery terminal, the material coming in electrical and mechanical contact with this terminal must also be different in order to ensure a low junction resistance.

In order to provide an economical battery cell connector, it is therefore proposed that a flat piece be arranged materially bonded (material fit), for example welded, on the second terminal part. The flat piece is in this case made of a second electrically conductive material. Preferably, the first terminal part is made of the same material as the first battery terminal of the first battery and the flat piece is made of the same material as the second battery terminal of the second battery.

For example, the first battery terminal may be formed from aluminium. In this case, at least the surface of the first terminal part may likewise be formed from aluminium. The oppositely poled terminal of the second battery may, for example, be formed from steel. In this case, the flat piece may be formed from steel at least on the surface. Via the connecting part, the first terminal part is electrically connected to the second terminal part and the flat piece, respectively, and current can flow through the battery cell connector between the battery terminals of the two batteries.

In particular, the terminal part formed from aluminium may be soft-annealed. The terminal part may be formed from a soft-annealed aluminium sheet or strip. Soft annealing of the aluminium of the terminal part leads to increased elasticity of the terminal part, so that in particular the axial compensatability is increased. Axial movements of the battery can therefore be compensated for. The connecting part may also be formed from soft-annealed aluminium. In particular, the soft annealing may be carried out at between 200 and 600° C., preferably at 400°. In particular, the soft annealing may be carried out under a protective gas atmosphere.

According to an embodiment, the surface of the flat piece facing towards the battery is coplanar with the first terminal part. In a battery module, the batteries will preferably be arranged so that the oppositely poled terminals of batteries, arranged next to one another, are substantially arranged in a plane. In order then to connect these terminals, lying substantially in a plane, to one another, the surfaces of the flat piece and of the first terminal part are coplanar.

It should be mentioned that this coplanarity may be obviated when making contact by flexibility of the connecting part. For example, the battery cell connector may be pressed by a tool against the battery terminals during the material bonding of the terminal part and the flat piece to the respective battery terminals. In this way, tolerance-related variations between the terminals can be compensated for, and in particular the battery cell connector can be displaced in a tolerance range.

According to an embodiment, the first and/or second terminal part is formed as a flat part. The flat piece may furthermore be formed as a flat part. By configuration as a flat part, the terminal parts can be arranged closely on the ends of the batteries with a small space requirement.

According to an embodiment, the connecting part is formed integrally with the first and/or second terminal part. This makes it possible to produce the battery cell connector particularly economically. For example, the first terminal part, the second terminal part and the connecting part may be formed from the same material.

For example, the first terminal part, the connecting part and the second terminal part may be stamped from a metal sheet or a strip. In this way, the first and second terminal parts and the connecting part can be produced economically in a single working step.

According to an embodiment, at least one terminal part is formed from or coated with aluminium, tin, zinc, copper, silver or alloys thereof. Terminal parts may be made of solid material consisting of one of the said metals or alloys thereof. It is also possible for the terminal parts to be formed from a first metal and coated with a second metal or alloys thereof. Particularly in order to ensure good electrical contact, a silver coating may for example be provided. When selecting the material on the terminal part exterior, however, it is necessary to ensure that this material corresponds to the material of the battery terminal to be connected to it, so as not to create any galvanic cell at the junction, which could destroy the material-fit connection or have an excessive junction resistance.

According to an advantageous exemplary embodiment, the flat piece is formed from or coated with steel, tin, zinc, copper, nickel, iron, aluminium, silver, gold or alloys thereof. Depending on the configuration of the terminal parts, the flat piece may also either be made of solid material or coated with a suitable metal.

According to an advantageous exemplary embodiment, the flat piece is welded to the second terminal part. In this case, a friction welding method may be used. For example, an ultrasound welding method may be used for connecting the flat piece to the terminal part. Friction stir welding, torsional friction welding, rotational friction welding or another friction welding method may nevertheless also be envisaged. It is also possible to use a multi-orbital friction welding method. Furthermore, the flat piece may also be connected to the terminal part with a material fit by means of a resistance welding method.

For tolerance compensation between the flat piece and the first terminal part when the battery terminals to be connected are arranged in different planes, it is proposed that the connecting part be configured flexible.

Such flexibility may, for example, be achieved in that the connecting part comprises mutually separated ribs. In this case, a plurality of individual ribs may be formed as connecting webs between the terminal parts. The individual ribs are mutually separated and have an intermediate space. In this way, increased flexibility of the connecting part is achieved.

In particular, using ribs of corrugated shape in the connecting part according to an advantageous exemplary embodiment ensures the required flexibility between the terminal parts and the connecting part.

According to an embodiment, the ribs are coplanar at least with the side of the first terminal part and/or of the second terminal part facing away from the battery. In this case, the ribs extend in the same plane as the first and/or second terminal part.

According to an embodiment, the ribs are furthermore formed so as to project from the plane of the at least one terminal part. The ribs may, for example, on the one hand be formed with a corrugated shape in the plane of a terminal part, so that the ribs do not project from the plane of the terminal part. It is, however, also possible for the ribs to project from a plane of a terminal part, for example upwards and downwards. Both rib shapes offer the required flexibility wherein the ribs which project from the plane of the terminal part can ensure increased flexibility perpendicularly to the plane of a terminal part, and ribs which extend in the plane of the terminal parts can ensure increased flexibility in the plane of a terminal part.

According to an embodiment, the ribs can furthermore be formed from the connecting part by at least one of the methods: stamping, cutting, laser cutting, water-jet cutting. As explained above, the connecting part with the two terminal parts may be stamped from a metal sheet or a strip. The ribs may, for example, be stamped at the same time. It is also possible for the ribs to be cut from the connecting part, in such a way that the spacings between the ribs are formed in the connecting part.

According to an embodiment, the connecting part is formed from at least two foils, in particular metal foils or coated foils. Two or a plurality of foils, and even for example ten foils, may be laid above one another and form the connecting part. At the respective ends of the foils, they may be connected to the terminal parts with a material fit so that a current flow from one terminal part through the foils to the other terminal part is possible. Foils offer the advantage that they ensure increased flexibility and are simple to apply.

According to an embodiment, the connecting part is formed from one of the materials: stranded aluminium, stranded copper, braided aluminium, braided copper. Besides using foils, it is also possible to employ a plurality of stranded conductors or braided conductors as a connecting part. These stranded conductors or braided conductors may be connected with a material fit to the terminal parts at their respective ends.

For a material-fit connection of these stranded conductors, braided conductors or foils to the terminal parts, it is proposed that the braided part should be compacted at least partially in the region of a terminal part. Compacting may mean that the individual layers or braided conductors are pressed so that they have substantially no air gap. Compacting may, for example, be achieved by brief pressing and heating. Compacted foils, compacted stranded conductors or compacted braided conductors can be connected with a material fit to the terminal parts in a particularly straightforward way using a tool. In particular a friction welding method, a resistance welding method or an ultrasound welding method may be used for compacting the ends of the connecting part in the region of the terminal parts.

According to an embodiment, the connecting part is connected at least partially in the region of at least one terminal part with a material fit to the terminal part. This material-fit connection may, as explained above, be carried out by welding. The effect achieved by the material-fit connection is that the junction resistance between the terminal part and the connecting part is low and development of heat due to power loss is therefore minimised.

According to an embodiment, the connecting part, the first terminal part and/or the second terminal part form an offset between a plane of the first terminal part and a plane of the second terminal part. As explained above, a flat piece is arranged on the second terminal part. The offset is proposed in order to bring the surface of the flat piece facing towards the battery substantially into a plane with the surface of the first terminal part facing towards the battery.

According to an embodiment, the offset is such that the surface of the first terminal part facing towards the battery is coplanar with the surface of the flat piece facing towards the battery. This coplanarity makes it possible for the battery terminals, which are to be connected, to be connected particularly simply to the battery cell connector with a material fit by using a tool.

The connection between the battery cell connector and the respective battery terminal may, for example, be carried out by means of a laser welding method. With laser welding, however, it is necessary that there is already mechanical contact between the components to be joined at the start of the welding process. Preferably, therefore, the first terminal part is pressed against a terminal of a first battery and the flat piece is pressed against an oppositely poled terminal of a second battery. The parts thus brought mechanically in contact are then welded by means of a laser.

In the battery modules such has been have been described above, the temperature of the respective batteries needs to be kept in a particular temperature window. If a battery is heated too much, there is a risk that the battery will be destroyed or in the worst case explode. If this happens, the entire battery module will be destroyed. Each individual battery should therefore have its temperature monitored. In order to make this possible, it is proposed for the first terminal part to comprise a connecting region formed from a third electrically conductive material on the side facing away from the battery. The connecting region may also be arranged on the second terminal part or the connecting part. The temperature tap may be carried out by means of temperature sensors. It is possible to mount the temperature sensor on the cell connector, for example by means of SMD. Separate monitoring of each individual pair of batteries is possible and a rise in the temperature beyond a limit value can be detected, whereupon the module may be switched off.

A connecting wire of a conductor plate may be connected, for example soldered, on the connecting region. This connecting wire makes a voltage tap on the battery cell connector possible. Thus, by means of the connecting wire, the voltage of the battery cell connector and therefore respectively the voltage of the individual batteries can be monitored.

According to an embodiment, the connecting region is furthermore flush with the surface, facing away from the battery, of the first or second terminal part or connecting part. This minimises the installation space of the battery cell connector.

According to an embodiment, the connecting region is coated with the third metal. The coating with the third metal may be carried out before, during or after the formation of the terminal parts and the connecting part.

It is also possible for the connecting region to be roller-plated with the third metal. In this case, the connecting region, or the third metal on the first terminal part or the second terminal part or the connecting part may be roller-plated.

According to an advantageous exemplary embodiment, the connecting region is formed from one of the metals: copper, nickel, tin, zinc, silver, gold or alloys thereof. It is also possible to coat the connecting region with a metal or an alloy.

According to an embodiment, an opening for the battery is arranged in at least one terminal part. In particular lithium ion batteries, but also other chemical energy storage devices, have to be able to "breathe" and therefore comprise rupturable membranes.

An opening is necessary on at least one of the terminals, but preferably on each of the two terminals of the battery. If, as proposed, the flat piece and the first terminal part are now connected to the terminal with a material fit, the possibility of degassing must be ensured. This possibility of degassing is afforded by the opening or recesses in the terminal part and/or the flat piece.

The opening also makes it possible to weld the terminal part to the battery terminal along its circumference using a laser.

According to an advantageous exemplary embodiment, the opening is round. For possible degassing of the cell, the recess is preferably as large as and congruent with the rupturable membrane.

It is furthermore proposed for the opening to comprise an extension interrupting its circumference. In this case, for example, the opening may initially be formed as a bore or other round opening, and then a projection extended therefrom may be cut out of the terminal part or the flat piece. The opening with the offset or extension cut out from the circumference may also be formed when forming the terminal parts or the flat piece, for example during the stamping.

In order to connect the terminal part or the flat piece to the battery terminal with a material fit, it is proposed for a diameter of the opening to be smaller than a battery terminal. It is therefore possible for the terminal part of the flat piece to be pressed onto the battery terminal, and mechanical contact is ensured between the terminal part or flat piece and the battery terminal without the terminal having to be pressed through the opening. Through the opening, the material-fit connection between the battery terminal and the battery cell connector may then be established for example using a laser in the region of the circumferential surface of the opening.

According to an embodiment, therefore, a battery or a battery terminal is connected at least partially along the inner circumference of the opening with a material fit to the first terminal part. This material-fit connection may, for example, be carried out by means of laser welding. Friction welding or ultrasound welding is also possible.

As already explained above, the flat piece and also the terminal part may comprise an opening. In order to ensure ventilation through the terminal part and the flat piece, it is proposed for the flat piece to comprise an opening coaxial with an opening in the second terminal part. The opening therefore passes through both the flat piece and the second terminal part.

According to an embodiment, a battery is furthermore connected at least partially along the circumference of the opening with a material fit to the flat piece. As already explained above for the terminal part, the battery or the battery terminal may be connected with a material fit to the flat piece by means of a welding method. Owing to the material-fit connection, the junction resistance between the battery cell connector and the respective battery terminals is low, so that any power loss in the junction is low and development of heat is substantially avoided or reduced.

According to an embodiment, the opening of the second terminal part is furthermore larger than the ventilation opening of the first terminal part, and the size of the opening of the flat piece corresponds to the size of the ventilation opening of the first terminal part. The opening of the flat piece and the ventilation opening of the first terminal part therefore are, corresponding to one another, in particular so large that their external diameter is less than the size of a terminal of a battery. A larger opening, which is coaxial with the opening of the flat piece, may be provided in the second terminal part.

According to one aspect, the object is also achieved by a battery cell connector according to claim 34.

It has been discovered that a corrugated longitudinal section of the connecting part increases its flexibility. In particular, it is advantageous for the flexibility of the connecting part to be increased in at least two spatial directions. By the increased flexibility, tensile and the compressive forces in both the horizontal and vertical directions can easily be absorbed by the connecting part, so that these forces are not transmitted to the point of connection between the battery cell connector and the battery terminal. The corrugated longitudinal section furthermore makes it possible for the torsion forces to be absorbed by the connecting part. The two terminal parts can therefore be moved horizontally and vertically relative to one another, as well as twisted relative to one another, the forces being absorbed by the connecting part. The connecting part is preferably configured so that it has a reduced planar moment of inertia in at least two spatial directions compared with a flat connecting part. The connecting part is preferably corrugated in such a way that its elasticity is increased in at least two spatial directions compared with a flat connecting part.

It is also preferable for the corrugated longitudinal section to be configured so that the connecting part first departs from the lengthwise plane of the terminal part at an angle with respect to the first terminal part. In a central part of the connecting part, the connecting part may be curved so that the central part substantially extends perpendicularly, but preferably between 45 and 90°, to the lengthwise direction. This central part may connect a corrugation ridge to a corrugation trough of the connecting part. Starting from the corrugation trough, the connecting part may then again extend at an angle with respect to the second terminal part.

In the region of its corrugated longitudinal section, the connecting part forms a deformation region which is preferably elastically deformable. This deformation region can absorb tensile and compressive forces both axially and radially between the terminal parts. The connecting part can also absorb torsion forces between the terminal parts.

Corrugated in the context of the invention may mean that the connecting part emerges upwards and downwards from the lengthwise plane of the connecting parts.

Longitudinal section in the context of the invention may mean that it is the section through the two terminal parts and the connecting part. The longitudinal section may relate to that plane which lies parallel to the lengthwise direction and perpendicular to the wide surface of the terminal parts as well as the connecting part.

According to an embodiment, the connecting part comprises at least one corrugation ridge and one corrugation trough in longitudinal section. The corrugation ridge is in general the maximum excursion of the connecting part upwards out of the plane of the surface of the terminal parts. The corrugation trough is in general the maximum excursion of the connecting part downwards out of the plane of the surface of the terminal parts. Owing to the fact that a corrugation trough and a corrugation ridge form the corrugated longitudinal section, the connecting part can absorb tensile and compressive forces both horizontally and vertically.

Particularly preferably, the connecting part is Z-shaped in longitudinal section. Z-shaped in the context of the subject matter may mean that the central web is substantially perpendicular or at most inclined by 10 to 40° with respect to the perpendicular, and that the upper and lower branches of the Z are formed at an angle with respect to the horizontal.

According to an embodiment, the connecting part is also tapered in longitudinal section in a part substantially extending perpendicularly to the lengthwise direction. The tapering may be provided in particular in the central part of the connecting part. The effect of the tapering is that the connecting part has an increased flexibility. The capacity for absorbing forces in the connecting part can thereby be increased.

According to an embodiment, the connecting part comprises at least two bending angles of more than 90° in longitudinal section. The bending angles are preferably the angles through which the central part of the connecting part is bent relative to the outer parts of the connecting part. The outer parts of the connecting part are respectively formed at an angle with respect to the surface of the terminal parts. In particular, they are formed at an angle with respect to the wide surface of the terminal parts. In order to be able to form a substantially perpendicular central part, the angularly arranged connecting parts must respectively be bent through more than 90°.

One embodiment provides a battery cell connector in which the first and/or second terminal part is formed as a flat part.

One embodiment provides a battery cell connector in which at least one terminal part is formed from or coated with A) aluminium,
B) tin,
C) zinc,
D) copper,
E) silver or alloys thereof.

One embodiment provides a battery cell connector in which the flat piece is formed from or coated with
A) steel,
B) tin,
C) zinc,
D) copper,
E) silver
or alloys thereof.

One embodiment provides a battery cell connector in which the ribs are formed from the connecting part by one of the methods:
A) stamping,
B) cutting,
C) laser cutting,
D) water-jet cutting.

One embodiment provides a battery cell connector in which an opening for laser welding of the terminal part and the battery terminal is arranged in the terminal part.

Another subject matter is a method for producing a battery cell connector as described above, comprising the steps of forming a first terminal part made of a first electrically conductive material, forming a second terminal part, and material-fit connection of a flat piece, formed from a second electrically conductive material, on a side of the second terminal part facing towards a battery terminal.

Another subject matter is a system, consisting of at least two batteries arranged oppositely poled next to one another, the opposite poled battery terminals of two batteries respectively being arranged subject to tolerance in a terminal region, the battery terminals of a first polarity being formed from a first electrically conductive material and the battery terminals of a second polarity being formed from a second electrically conductive material, and at least one battery cell connector as described above, which is connected by a first terminal part with a material fit to a first battery terminal of a first polarity of the first battery and is connected by the flat piece with a material fit to a second battery terminal, of a second polarity of a second battery, which is assigned to the first battery terminal. Modules consisting of a plurality of batteries can be produced by means of this system.

According to an embodiment, the at least two batteries are electrically connected in series by the battery cell connector.

In this way, the output voltage of a module can be increased according to the number of batteries connected in series.

According to an embodiment, respectively at least two batteries are arranged vertically above one another in two columns and connected by a battery cell connector, and the last batteries of a respective column are respectively connected by a battery cell connector.

It is also proposed to use the battery cell connector in a start battery of a combustion engine.

The features according to the advantageous exemplary embodiments may be combined freely with one another. Also, the features of the exemplary embodiments may respectively be taken independently and freely combined with all features of the independent claims. In particular, the characterising part of the independent claims is not compulsory for implementing an inventive subject matter, so that features of the precharacterising clauses may also be combined freely with all other features of the claims or description. The features of all the dependent claims may also be combined with the features of all the independent claims.

The subject-matter will be explained in more detail below with reference to a drawing which shows embodiments. In the drawing.

Figure 1A:
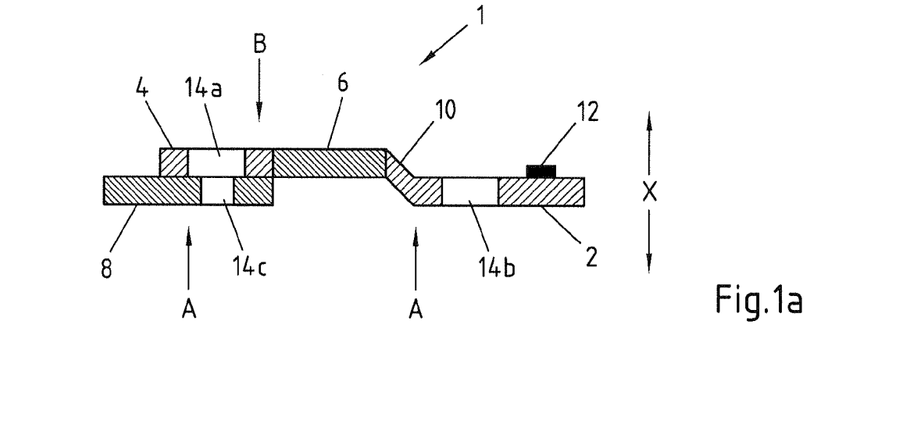
FIG. 1a shows a sectional view of a first battery cell connector.
Figure 1B:
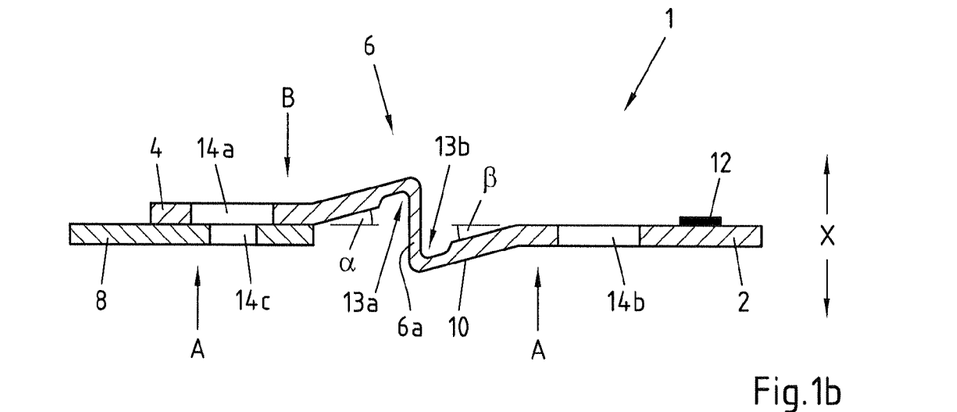
FIG. 1b shows a sectional view of a second battery cell connector.

FIGS. 1a,b show a view of a battery cell connector 1 in longitudinal section. The sectional view shows that the battery cell connector 1 is formed from a first terminal part 2, a second terminal part 4, a connecting part 6 and a flat piece 8 arranged on the second terminal part 4.

It can be seen in FIG. 1a that the connecting part 6 is arranged in one plane with the second terminal part 4. The connecting part 6 may be formed integrally with the second terminal part 4 and the first terminal part 2. The connecting part 6 may also be an independent component and connected with a material fit to the first terminal part 2 and the second terminal part 4.

It can be seen in FIG. 1b that the connecting part 6 is arranged with a Z-shape between the first terminal part and the second terminal part 4. The connecting part 6 may be formed integrally with the second terminal part 4 and/or the first terminal part 2. The connecting part 6 may also be an independent component and connected with a material fit to the first terminal part 2 and the second terminal part 4.

An offset 10 is arranged in the first terminal part 2. The offset 10 could, however, also be arranged in the connecting part 6 or in the second terminal part 4. Owing to the offset 10, the side A of the first terminal part 2 facing towards a battery is substantially coplanar with the side A of a flat piece 8 facing towards the battery.

The flat piece 8 is connected with a material fit to the second terminal part 4 on the side A of the second terminal part 4 facing towards the battery.

The first terminal part 2 and the flat piece 8 are preferably formed from different electrically conductive materials, in particular metals, or coated with such materials or metals. For example, the first terminal part 2 may be formed from aluminium and the flat piece 8 from steel. It is also possible for the first terminal part 2 to be coated with a metal other than aluminium, for example tin, zinc, copper, nickel, iron, steel, silver, gold etc. or to be formed from a solid material. Alloys of the said metals are likewise possible.

The flat piece 8 may be formed from steel, tin, zinc, copper, aluminium, nickel, iron, silver, gold etc. or alloys thereof, or coated with these metals.

It can also be seen in FIG. 1b that the connecting part 6 is Z-shaped, two outer parts of the connecting part 6 being arranged angularly at the angles α and β with respect to the terminal parts 2 and 4. In a central region 6a of the connecting part 6, the connecting part is tapered. Furthermore, the bending angles 13a and 13b are provided. Along these bending angles 13, the connecting part 6 is bent through more than 90° so that there is a central region 6a of the connecting part 6 substantially extending perpendicularly.

The angles α and β are generally between 1 and 10°. The angles α and β may be identical. It is also possible for the angle α to be greater than the angle β, in which case the offset 10 will be formed in the connecting part 6 since the end piece of the connecting part 6 facing towards the terminal part 2 is inclined less than the end piece of the connecting part 6 facing towards the terminal part 4.

It can furthermore be seen that the corrugated shaping in longitudinal section comprises a corrugation ridge and a corrugation trough. It can also be seen that the corrugation trough lies outside the surface plane of the wide surface of the terminal part 4. As can be seen in FIG. 1*b*, the corrugation trough lies outside the lower surface plane of the wide surface of the terminal part 2.

It can be seen in FIGS. 1*a,b* that the first terminal part 6 comprises an opening, for example a welding opening, positioning opening or ventilation opening 14*b*. The second terminal part 4 comprises a welding opening or ventilation opening 14*a*, and the flat piece 8 comprises a welding opening or ventilation opening 14*c*. The purpose of the welding opening is that, in a laser welding method, the laser can be directed through the opening onto the flat piece and/or the battery terminals, so that the terminal parts can be welded to the battery terminals by means of the laser beam.

The positioning opening 14*c* is coaxial with the welding opening 14*a*. The positioning opening 14*c* may, for example, have a diameter equal to that of the positioning opening 14*b*. The positioning opening 14*a* may, for example, have a greater diameter than the positioning opening 14*c*.

In order to fit the battery cell connector 1 on a battery 20, the battery cell connector 1 is pressed on the side B facing away from the battery 20 against two terminals 22, (not represented here), which are oppositely poled to each other, of two different batteries 20. In this case, the first terminal part 2 comes in contact with a first terminal 22 of a first battery 20 and the flat piece 8 comes in contact with a second terminal 24, oppositely poled to the first terminal, of a second battery 20. As soon as contact has been established, the first terminal part 2 can be connected with a material fit to the first battery terminal 22, for example, by means of a laser through the welding opening 14*b*. In that case, the laser beam is guided along the circumferential surface of the positioning opening 14*b*, so that a material-fit connection is formed. Through the welding opening 14*a* and the positioning opening 14*c*, the flat piece 8 can be connected by means of a laser with a material fit to the second terminal 24 of the second battery 20. As soon as the weld bead has cooled, or hardened, the pressure can be released and the battery cell connector 2 is connected with a material fit to the respective terminals 22, 24 of the two batteries 20.

In order to be able to monitor/sense the temperature and/or voltage of the battery cell connector 2 and respectively the batteries 20/cells in the terminal parts 2, 4, a connecting region 12 is arranged on the side B of the first terminal part 2 facing away from the battery 20. The connecting region 12 may, however, also be arranged on the connecting part 6 or on the second terminal part 4. The connecting region 12 may be formed from copper, silver, gold, tin, zinc, alloys thereof or other metals. The connecting region 12 may also be coated on the surface of the first terminal part 2, the connecting part 6 or the second terminal part 4 or roller-plated with the first terminal part 2, the connecting part 6 or the second terminal part 4. Via the connecting region 12, a take-off may lead to an integrated circuit or a printed circuit board 40, in which the cell/battery may have its voltage, current strength and/or its temperature monitored and/or influenced.

The connecting part 6 makes it possible for the sides A of the first terminal part 2 and of the flat piece 8 facing towards the battery 20 to be displaced relative to one another in the direction X. By means of this, during the material-fit connection of the battery cell connector 1 to the batteries 20 (not represented here), tolerance compensation can be carried out in a tolerance range 26. It is therefore possible for tolerances in the position of the battery terminals 22, 24 to be compensated for, while nevertheless permitting a material-fit connection by means of a welding method between the first terminal part 2 and the battery terminal 22, 24, or the flat piece 8 and the battery terminal 22, 24.

Figure 2A:
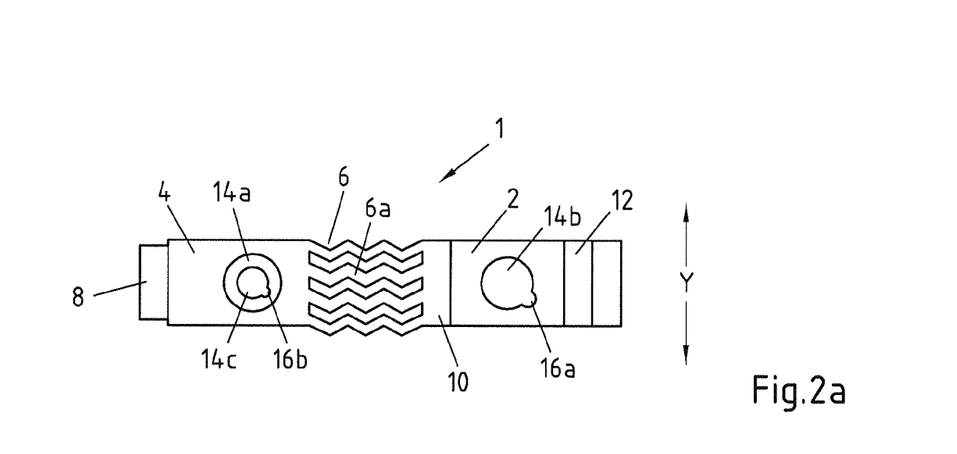
FIG. 2a shows a view of a first battery cell connector.

FIG. 2*a* shows a plan view of another alternative of a battery cell connector 1. References which are the same respectively denote elements of the same type in the figures. It can be seen in FIG. 2*a* that the connecting part 6 is formed from mutually separated ribs 6*a*. As can be seen, the ribs are of corrugated shape. In FIG. 2, the ribs extend in the plane of the second terminal part 4. It is, however, also possible for the ribs to project from the plane of the second terminal part 4. By means of the ribs 6*a*, it is possible for the first terminal part 2 to be displaceable relative to the flat piece 8, or the second terminal part 4, in the direction Y, likewise in order to achieve tolerance compensation. It can be seen in FIG. 2*a* that the first terminal part 2 comprises the ventilation opening 14*b*. The extension 16*a* protruding from the circumference of the ventilation opening 14*b* is represented in the ventilation opening 14*b*.

Figure 2B:
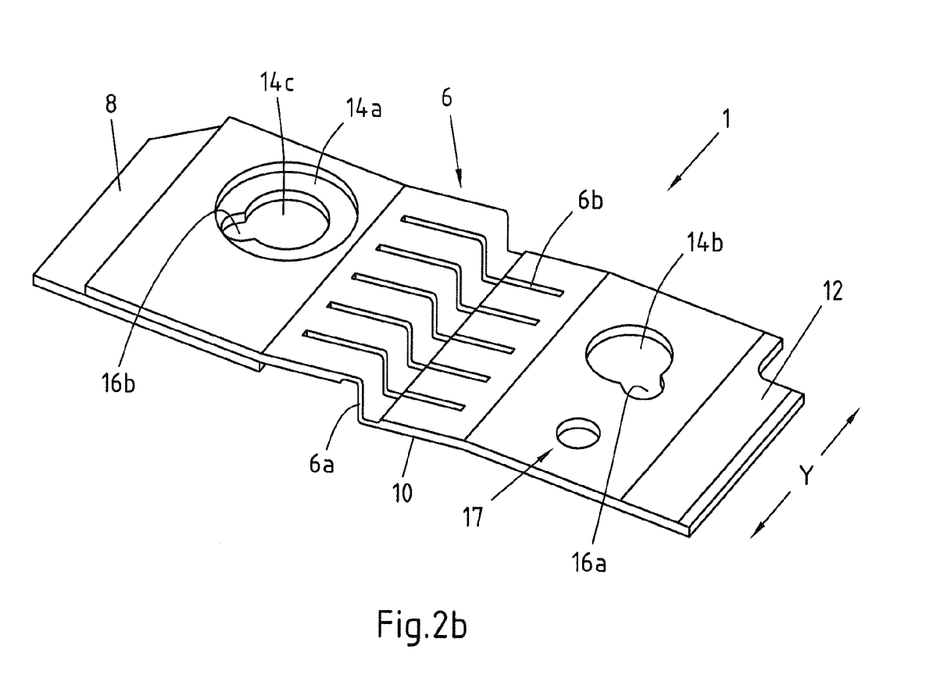
FIG. 2b shows a view of a second battery cell connector.

FIG. 2*b* shows a view of another alternative of a battery cell connector 1. References which are the same respectively denote elements of the same type in the figures. It can be seen in FIG. 2*b* that grooves/holes 6*b* have been formed/introduced in the connecting part 6. As can be seen, the grooves extend in the lengthwise direction of the connecting part 6. By means of the groove/tapering 6*a*, the flexibility of the connecting part is increased in the Y direction in order to permit tolerance compensation. The grooves 6*b* may pass through the connecting part 6.

A corresponding, preferably equally large positioning opening 14*c* with an offset 16*b* is formed in the flat piece 8, as can likewise be seen in FIG. 2. Formed coaxially with the positioning opening 14*c*, there is a welding opening 14*a* in the connecting part 4, the diameter of which is greater than the diameter of the positioning opening 14*c*.

Figure 2C:
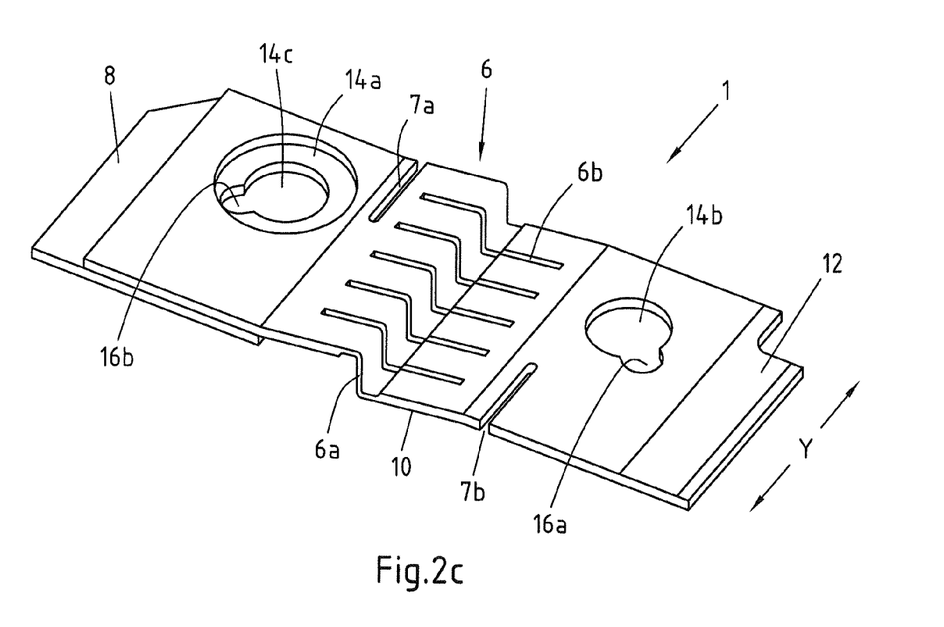
FIG. 2c shows a further view of the second battery cell connector.

FIG. 2*c* shows another view of a battery cell connector 1. In a manner corresponding to FIG. 2*a*, this battery cell connector is also provided with grooves 6*b*. The grooves 6*b* preferably pass through the entire material.

It can also be seen that the connecting part 6 is tapered in the region of the central part 6*a*. This means that its cross section is smaller than the cross section of the connecting part on the outwardly facing regions.

It can furthermore be seen in FIG. 2*c* that the terminal parts 2, 4 are provided with inwardly facing slot-like recesses 7*a*, 7*b*. The recesses 7*a*, 7*b* in the form represented are arranged in the terminal parts 2, 4, although there may also readily be arranged in the connecting part 6. The recesses 7 are preferably shorter than half the width of the battery cell connector. The recesses 7*a*, 7*b* are preferably arranged on mutually opposite sides respectively on a terminal part 2, 4. The recesses 7*a*, 7*b* are used to increase the flexibility of the battery cell connector 1 transversely to the lengthwise direction. The recesses 7 preferably extend perpendicularly to the outer edge of the cell connector 1.

Figure 3A:
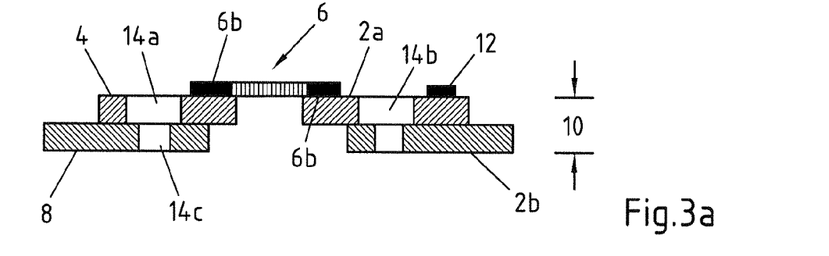
FIG. 3a shows a sectional view of a first battery cell connector.

FIG. 3*a* shows a sectional view with another alternative. It can be seen in FIG. 3 that the offset 10 is formed by first terminal part 2 formed in two pieces, comprising the parts 2*a* and 2b. These parts may be connected to one another with a material fit and be formed from the same metal or from different metals. It can furthermore be seen in FIG. 2 that the connecting part 6 is formed from a braided conductor. This may comprise braided aluminium or braided copper. Braided conductors made of other metals are likewise possible. It can also be seen that the connecting part 6 comprises two compacted regions 6b, which are respectively provided in the region of the first terminal part 2 and in the region of the second terminal part 4. At the compacted regions 6b, the connecting part 6 may be connected with a material fit respectively to the first terminal part 2 and to the second terminal part 4. To this end, for example, a friction welding, resistance welding, ultrasound welding or other welding method, or another connection method, may be used.

Figure 3B:
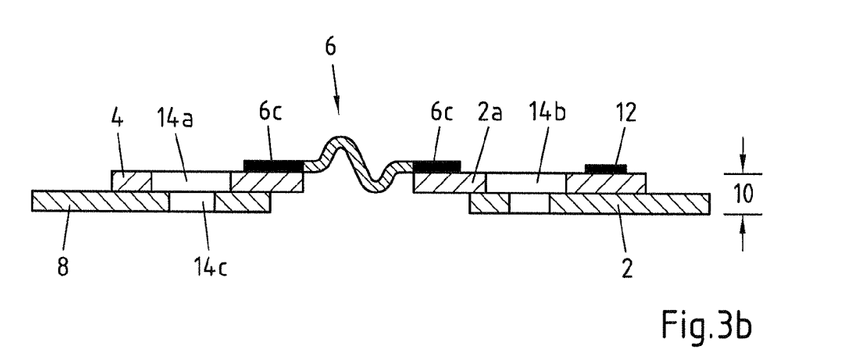
FIG. 3b shows a sectional view of a second battery cell connector.

FIG. 3b shows a sectional view with another alternative. It can be seen in FIG. 3 that the offset 10 is formed by a terminal part 2 formed in two pieces, comprising the parts 2a and 2b. These parts may be connected to one another with a material fit and be formed from the same metal or from different metals. It can furthermore be seen in FIG. 2 that the connecting part 6 is formed with a corrugated shape from a braided conductor. The corrugations are in this case S-shaped rather than Z-shaped. Other corrugation shapes are possible in all the examples. It may comprise braided aluminium or braided copper. Braided conductors made of other metals are likewise possible. It can also be seen that the connecting part 6 comprises two compacted regions 6c, which are respectively provided in the region of the first terminal part 2 and in the region of the second terminal part 4. At the compacted regions 6c, the connecting part 6 may be connected with a material fit respectively to the first terminal part 2 and to the second terminal part 4. To this end, for example, a friction welding, resistance welding, ultrasound welding or another welding method, or other connection method, may be used.

Figure 4A:
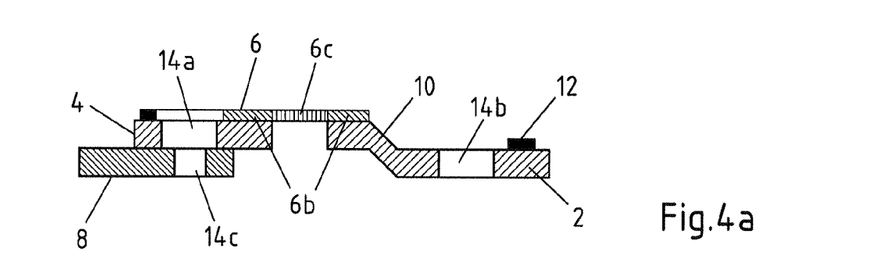
FIG. 4a shows a sectional view of a first battery cell connector.

FIG. 4a shows another exemplary embodiment. In the exemplary embodiment shown in FIG. 4a, the connecting part 6 is formed from foils 6c which likewise comprise compacted regions 6b. The compacted region 6b in the region of the second terminal part 4 extends over the ventilation opening 14a. In the region of the ventilation opening 14a and in the region of the end of the space between the first terminal part 2 and the second terminal part 4, the connecting part 6 can be connected to the second terminal part 4 with a material fit. The connecting part 6 can likewise be connected to the first terminal part 2 with a material fit. The fact that the compacted region 6b of the connecting part 6 extends substantially over the majority of the surface of the second terminal part 4 provides a large contact surface and therefore a low junction resistance. The second compacted region 6b may also extend along the offset 10 is far as the connecting region 12 over the first terminal part 2, and likewise comprise an opening in the region of the ventilation opening 14b.

Figure 4B:
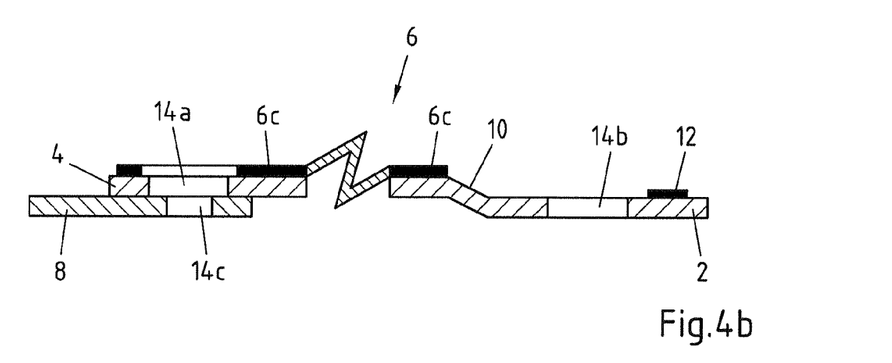
FIG. 4b shows a sectional view of a second battery cell connector.

FIG. 4b shows another exemplary embodiment. In the exemplary embodiment shown in FIG. 4b, the connecting part 6 is formed from corrugated foils which likewise comprise compacted regions 6c. The compacted region 6c in the region of the second terminal part 4 extends over the ventilation opening 14a.

Figure 5:
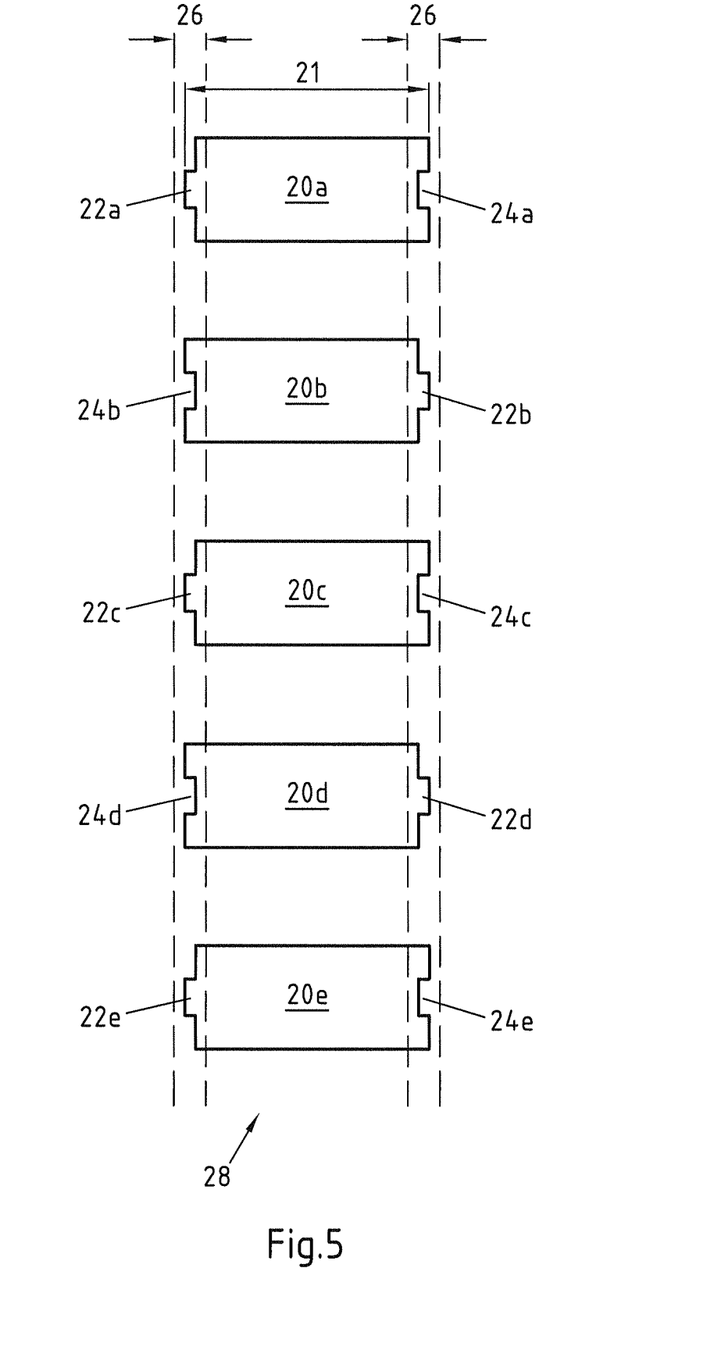
FIG. 5 shows a side view of a column comprising five batteries in a battery module.

FIG. 5 shows a schematic side view of a first column 28 of five batteries 20 a-e, respectively having a first terminal 22 a-e and a second terminal 24 a-e. It can be seen that the batteries 20 a-e are arranged above one another in the column 28. It can furthermore be seen that the terminals 22, 24 are arranged alternately. This means that, for example, a positive terminal 22a of the battery 20a is arranged in one plane with a negative terminal 24b of a battery 20b. This is followed in turn by a positive terminal 22c, a negative terminal 24d and another positive terminal 22e.

It can furthermore be seen that the terminals 22, 24 of the batteries 20 are arranged in a tolerance range 26, which is represented in exaggeratedly here. The tolerance range 26 indicates the region within which the terminals may be arranged. The length 21 of the respective batteries, i.e. the distance of the terminals 22, 24 from one another, is subject to tolerance. It follows from this that the terminals 22, 24 are not always coplanar, so that this tolerance must be compensated for when connecting to a battery cell connector 1.

For the sake of clarity, the column 28 is represented without a battery cell connector in FIG. 5. A first battery cell connector 1a would, for example, be arranged between the positive terminal 22a and the negative terminal 24b. After this, the positive terminal 22b would be connected by a battery cell connector 1 to a negative terminal 24c. The positive terminal 22c would be connected via a battery cell connector to the negative terminal 24d. The positive terminal 22d would be connected via a battery cell connector 1 to the negative terminal 24e. The positive terminal 22e would be connected by a battery cell connector to a negative terminal of a battery of a further column 28. The battery cell connectors 1 along a column 28 would be arranged vertically, and a battery cell connector 1 which connects two columns 28 to one another would be arranged horizontally.

Figure 6:
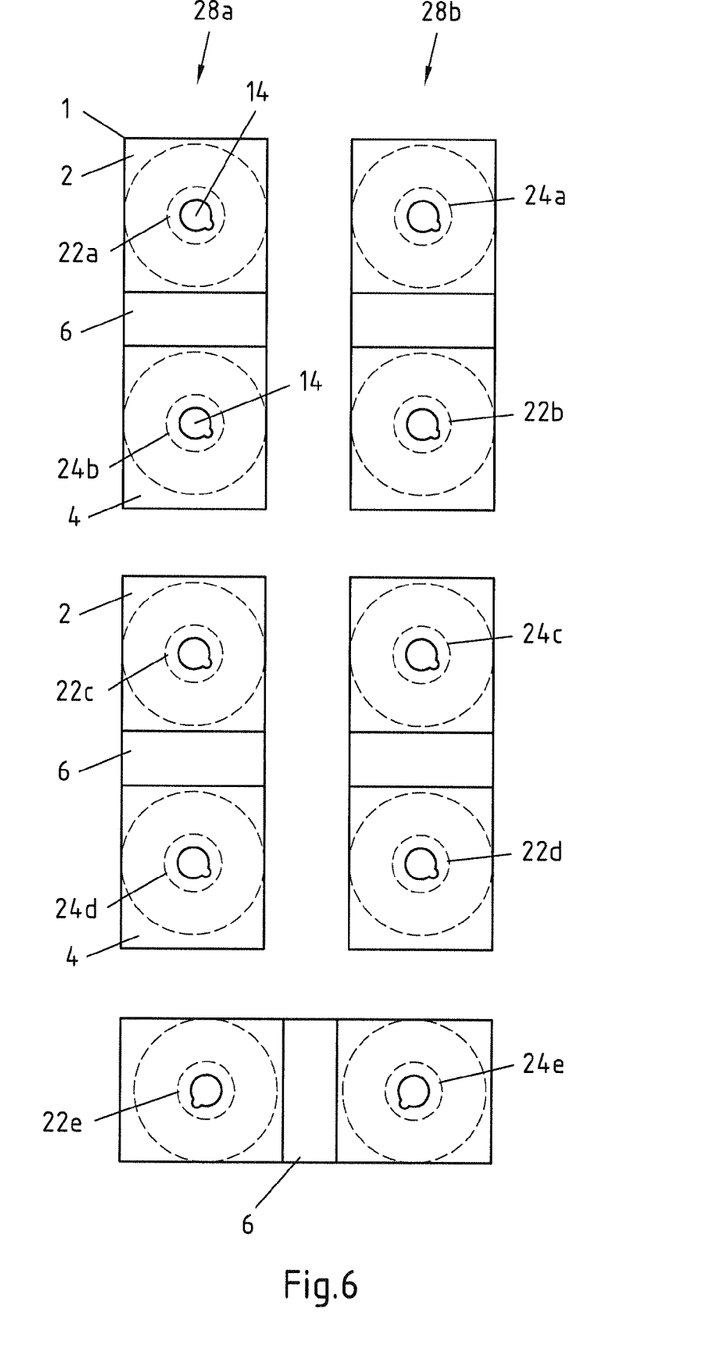
FIG. 6 shows a plan view of a battery module comprising five batteries connected in a column and two columns.

Such an arrangement can be seen, for example in FIG. 6. FIG. 6 shows two columns 28a, 28b next to one another. It can be seen here that the battery cell connectors 1 respectively connect a positive terminal 22a to a negative terminal 24b and a positive terminal 22c to a negative terminal 24d. The column 28a is connected via the positive terminal 22e and the battery cell connector 1 to the negative terminal 24e of the column 28b.

By virtue of the inventive battery cell connector 1, uniform connection is ensured between a battery cell connector 1 and a respective battery terminal 22, 24. A low junction resistance is therefore possible. Tolerance compensation is likewise possible with the inventive battery cell connector, since it can preferably absorb shear, tensile/compression and torsion forces through the corrugated connecting part. The inventive battery cell connector 1 can be produced economically and permits material-fit connection to battery terminals 22, 24 of different polarity.

The invention claimed is:
1. Battery cell connector, comprising:
a first terminal part adapted for connecting to a battery terminal of a first battery,
a second terminal part,
a connecting part which is arranged between the two terminal parts and which electrically connects the terminal parts to one another, wherein the first terminal part is formed at least on the side (A) facing a battery terminal from a first electrically conductive material, and
wherein a flat piece, which is formed for connecting to a second battery terminal and which is formed at least on the side (A) facing the second battery terminal from a second electrically conductive material different from the first electrically conductive material, is arranged materially bonded on the second terminal part,
wherein the connecting part comprises a Z-shaped longitudinal cross-section, wherein the Z-shaped longitudinal cross-section includes a central web which is inclined by no more than 20° with respect to perpendicular to the flat piece, wherein the Z-shaped longitudinal cross-section is corrugated such that the connecting part is elastically deformable in at least two perpendicular spatial directions,
wherein the connecting part comprises at least one corrugation ridge and one corrugation trough in longitudinal cross-section, and
wherein the corrugation ridge and the corrugation trough respectively lie outside the plane of at least one of the terminal parts.

2. Battery cell connector according to claim 1, wherein the surfaces of the flat piece and of the first terminal part facing towards the battery are coplanar.

3. Battery cell connector according to claim 1, wherein the first and/or second terminal part is formed as a flat part.

4. Battery cell connector according to claim 1, wherein the connecting part is formed integrally with the first and/or second terminal part.

5. Battery cell connector according to claim 1, wherein the flat piece is welded to the second terminal part.

6. Battery cell connector according to claim 1, wherein the connecting part is formed from at least two foils, and/or wherein the connecting part is formed from one of
   A) stranded aluminium,
   B) stranded copper,
   C) braided aluminium,
   D) braided copper.

7. Battery cell connector according to claim 1, wherein the first terminal part comprises a connecting region formed from a third electrically conductive material on the side (B) facing away from the battery.

8. Battery cell connector according to claim 7, wherein the connecting region is flush with the surface of the first terminal part facing away from the battery.

9. Battery cell connector according to claim 7, wherein the connecting region is coated with the third metal.

10. Battery cell connector according to claim 7, wherein the connecting region is roller-plated with the third metal.

11. Battery cell connector according to claim 1, further comprising an opening for the battery arranged in at least one terminal part.

12. Battery cell connector according to claim 11, wherein the opening comprises an extension cutting through its diameter.

13. Battery cell connector according to claim 11, wherein a diameter of the opening is smaller than a battery terminal.

14. Battery cell connector according to claim 11, wherein a battery is connected at least partially along the outer circumference of the opening materially bonded to the first terminal part.

15. Battery cell connector according to claim 1, wherein the flat piece comprises an opening coaxial with a ventilation opening in the second terminal part.

16. Battery cell connector according to claim 15, wherein a battery is connected at least partially along the outer circumference of the opening materially bonded to the flat piece.

17. Battery cell connector according to claim 15, wherein the welding opening of the second terminal part is larger than the positioning opening of the first terminal part, and in that the size of the positioning opening of the flat piece corresponds to the size of the positioning opening of the first terminal part.

18. Battery cell connector according to claim 1, wherein at least one terminal part is formed from a soft-annealed aluminium, and/or that the connecting part is partially or completely soft-annealed.

19. System, consisting of
   at least two batteries arranged oppositely poled next to one another, the oppositely poled battery terminals of two batteries respectively being arranged subject to tolerance in a terminal region, the battery terminals of a first polarity being formed from a first electrically conductive material and battery terminals of a second polarity being formed from a second electrically conductive material, and
   at least one battery cell connector according to claim 1, which is connected by a first terminal part with a material fit to a first battery terminal of a first polarity of the first battery and is connected by the flat piece with a material fit to a second battery terminal, of a second polarity of a second battery, which is assigned to the first battery terminal.

20. A battery cell connector according to claim 1, wherein the central web of the Z-shaped longitudinal cross-section is arranged substantially perpendicular to the flat plece.

21. A battery cell connector according to claim 1, wherein the central web of the Z-shaped longitudinal cross-section is oriented with an incline of at most 10° with respect to the perpendicular to the flat piece.

* * * * *

UNITED STATES PATENT AND TRADEMARK OFFICE
CERTIFICATE OF CORRECTION

PATENT NO. : 8,574,008 B2
APPLICATION NO. : 13/376746
DATED : November 5, 2013
INVENTOR(S) : Jürgen Große et al.

Page 1 of 1

It is certified that error appears in the above-identified patent and that said Letters Patent is hereby corrected as shown below:

In the Claims

In Col. 16, line 39
replace "plece"
with --piece--

Signed and Sealed this
Fourth Day of March, 2014

Michelle K. Lee
*Deputy Director of the United States Patent and Trademark Office*